(12) United States Patent
Yang et al.

(10) Patent No.: US 10,049,253 B2
(45) Date of Patent: Aug. 14, 2018

(54) SENSOR PIXEL CIRCUITRY FOR FINGERPRINT IDENTIFICATION

(71) Applicant: Shenzhen Goodix Technology Co., Ltd., Shenzhen, Guangdong (CN)

(72) Inventors: Mengda Yang, Shenzhen (CN); Kuohao Chao, Shenzhen (CN); Chang Zhan, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 15/237,019

(22) Filed: Aug. 15, 2016

(65) Prior Publication Data

US 2016/0350577 A1    Dec. 1, 2016

Related U.S. Application Data

(63) Continuation of application No. PCT/CN2014/088522, filed on Oct. 13, 2014.

(51) Int. Cl.
*G06K 9/00* (2006.01)
(52) U.S. Cl.
CPC ....... *G06K 9/0002* (2013.01); *G06K 9/00053* (2013.01)
(58) Field of Classification Search
CPC .......................... G06K 9/0002; G06K 9/00053
See application file for complete search history.

(56) References Cited

U.S. PATENT DOCUMENTS

2015/0346253 A1* 12/2015 Wang ................. G06K 9/00073
324/662
2016/0379032 A1* 12/2016 Mo ..................... G06K 9/00107
382/124

FOREIGN PATENT DOCUMENTS

| CN | 101344917 A | 1/2009 |
| CN | 103548035 A | 1/2014 |
| CN | 103870817 A | 6/2014 |
| WO | 2013109698 A1 | 1/2013 |

OTHER PUBLICATIONS

International Search Report to corresponding Int'l Pat. Appl. No. PCT/CN2014/088522, dated Jul. 23, 2015, 4 pages.

* cited by examiner

*Primary Examiner* — Phuoc Tran
(74) *Attorney, Agent, or Firm* — Tarolli, Sundheim, Covell & Tummino LLP

(57) ABSTRACT

In one aspect, a fingerprint sensor device for fingerprint detection includes an array of sensor pixels to capacitively couple with a touched portion of a finger to form an array of fingerprint associated capacitors having capacitive values indicative of a fingerprint. Each sensor pixel includes an output terminal configured to output an output signal that indicates a local capacitive coupling with the touched portion of the finger as part of fingerprint data for fingerprint detection; a capacitive sensing layer including an electrically conductive material that can be capacitively coupled to a local part of the touched portion of the finger, forming a fingerprint associated capacitor, the capacitive sensing layer operable to be coupled to the output terminal to cause the output signal; an integrated circuit layout layer that is electrically conductive; a fingerprint voltage generator; and a layout voltage generator.

18 Claims, 12 Drawing Sheets

US 10,049,253 B2

SENSOR PIXEL CIRCUITRY FOR FINGERPRINT IDENTIFICATION

CROSS-REFERENCE TO RELATED APPLICATIONS

The present application is a continuation application of international application No. PCT/CN2014/088522, filed on Oct. 13, 2014, which is hereby incorporated by reference in its entireties.

TECHNICAL FIELD

This patent document relates to sensor pixel circuitry and fingerprint identification.

BACKGROUND

Various electronic devices or information systems can employ user authentication mechanisms to protect personal data and prevent unauthorized access. User authentication on an electronic device or information system can be carried out through one or multiple forms of personal identification and authentication methods, including one or more biometric identifiers. A biometric identifier can be used alone or in addition to a conventional authentication method, such as a password authentication method. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. In some implementations, such as fingerprint sensor can include sensor pixel circuitry with pixelated pixel sensor elements for capturing fingerprint patterns for user identification.

SUMMARY

In one aspect, a fingerprint sensor device for fingerprint detection includes an array of sensor pixels configured to capacitively couple with a touched portion of a finger to form an array of fingerprint associated capacitors having capacitive values indicative of a fingerprint. Each sensor pixel includes an output terminal configured to output an output signal that indicates a local capacitive coupling with the touched portion of the finger as part of fingerprint data for fingerprint detection. Each sensor pixel includes a capacitive sensing layer including an electrically conductive material that can be capacitively coupled to a local part of the touched portion of the finger, forming a fingerprint associated capacitor, the capacitive sensing layer operable to be coupled to the output terminal to cause the output signal. Each senor pixel includes an integrated circuit layout layer that is electrically conductive and is capacitively coupled to a ground terminal, forming a layout associated capacitor, the layout layer operable to be coupled to the output terminal. Each sensor pixel includes a fingerprint voltage generator electrically coupled to supply power to the capacitive sensing layer to generate a fingerprint voltage to charge the fingerprint associated capacitor. Each sensor pixel includes a layout voltage generator electrically coupled to supply power to the integrated circuit layout layer to generate a layout voltage to charge the layout associated capacitor.

DETAILED DESCRIPTION

Capacitive fingerprint identification devices and systems sense capacitance variations to determine ridges and valleys of a user's finger. A low signal-to-noise ratio (SNR), when present in the capacitive fingerprint identification system, lowers the accuracy of fingerprint identification. One technique for increasing the SNR uses a metal ring to transmit an excitation signal directly to the finger to be identified to enhance the identification accuracy. The metal ring occupies valuable space on a semiconductor layout for the device, which increases product cost and affect appearances of products.

Figure 1A:
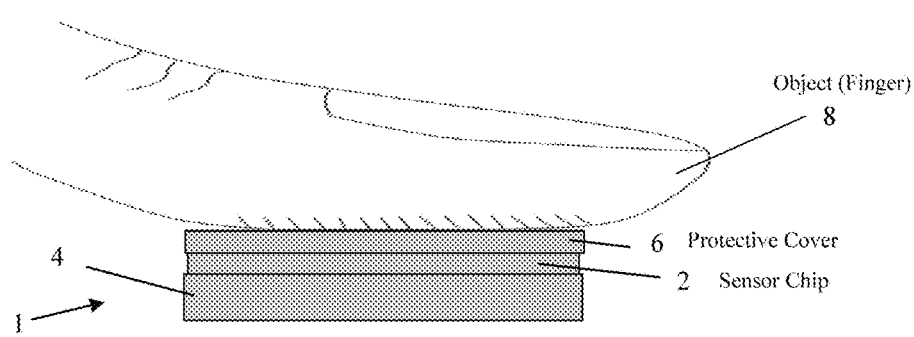
FIG. 1A is a block diagram showing an exemplary fingerprint sensor device.

FIG. 1A is a block diagram showing an exemplary fingerprint sensor device 1. The fingerprint sensor device 1 includes a sensor chip 2 disposed over a substrate carrier 4 and a protective film or cover layer 6 disposed over the sensor chip 2. The protective film or cover layer 6 can include an insulator or dielectric material such as glass, silicon dioxide (SiO$_2$), sapphire, plastic, polymer, other substantially similar materials. The protective film or cover layer 6 can be present to protect the sensor chip 2 and potentially function as a part of a dielectric layer between a surface of a finger 8 and conductive sensing electrodes of individual sensor pixels in the sensor chip 2. The protective film or cover layer 6 is an optional layer depending on the application of the fingerprint sensor device 1. The fingerprint sensor device 1 can be disposed through an opening of a top cover glass of an electronic device such as a mobile phone or under a top cover glass of the electronic device. When used in the under-the-glass application, the protective film or cover 6 is not needed because the top cover glass of the electronic device will function to protect the sensor chip 2 and act as the dielectric layer. The sensor chip 2 includes an array of sensor pixels that in combination senses or captures fingerprint data from the finger 8 in contact with the protective film or cover layer 6. Each sensor pixel of the sensor chip 2 generates an output signal (e.g., a voltage) based on a capacitance of a capacitor associated with a ridge or valley of the finger 8. The output signals when combined represents a fingerprint image of the finger 8. Higher the number of pixel sensors, greater the resolution of the fingerprint image.

Figure 1B:
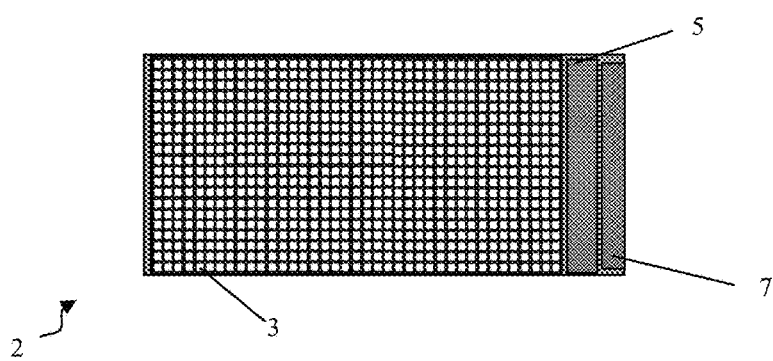
FIG. 1B is a diagram showing an exemplary sensor chip.

FIG. 1B is a diagram showing an exemplary sensor chip 2. The sensor chip 2 can include a pixelated sensor array 3 which can occupy a significant portion of the sensor chip 2. Each sensor pixel in the pixelated sensing element array 3 can include a CMOS capacitive sensor or other types of sensors that can sense fingerprint features. The sensor chip 2 can include a signal processing unit 5 for processing signals received from all of the sensor pixels in the pixelated sensor array 3, and a connection unit 7 electrically coupled to the signal processing unit 5. The signal processing unit 5 can include various signal processing components including amplifiers, filters, and an analog to digital converter (ADC). The connection unit 7 can include multiple electrodes which can be connected to external circuitry through wire-bonding, bump bonding or other connection means. The connection unit 7 can be disposed along an edge of the sensor chip 2 for the convenience of interfacing with other components of the fingerprint sensor device 1.

The array 3 of sensor pixels in the sensor chip 2 can be arranged to have various shapes and sizes. For example, the array 3 of sensor pixels can be arranged to have a rectangular shape with a width of the rectangular shape being larger than a height of the rectangular shape. Exemplary sizes for the rectangular shaped sensor chip can include 24×88, 32×88, 56×88 sensor pixels. In some implementations, the array 3 of sensor pixels in the sensor chip 2 can be arranged to have a square shape. Exemplary sizes for the square shaped sensor chip 2 include 32×32, 64×64, 96×96 and 128×128 sensor pixels.

Figure 2:
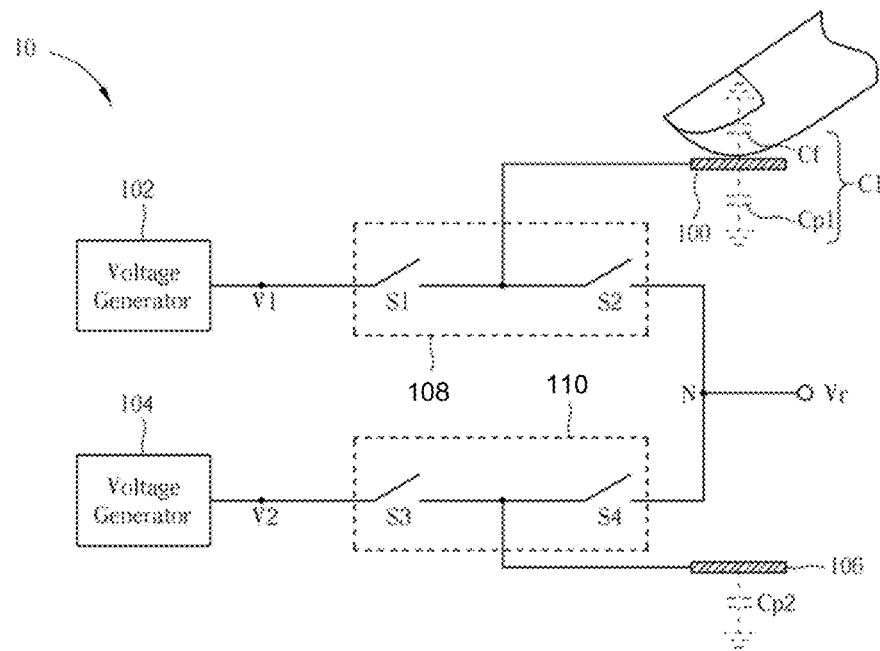
FIG. 2 is a schematic diagram of exemplary sensor pixel circuitry.

FIG. 2 is a schematic diagram of an exemplary sensor pixel circuitry 10 according to an embodiment of the disclosed technology. The sensor pixel circuitry 10 corresponds to at least part of the structure within each sensor pixel in the array 3 of sensor pixels. The sensor pixel circuitry 10 includes a capacitive sensing layer 100, a layout layer 106, voltage generators 102 and 104, and switching circuitry such as switching networks 108 and 110. In some implementations, the circuitry of switching networks 108 and 110 can be implemented using sample-and-hold circuitry. Within each sensor pixel, the capacitive sensing layer 100 can be a conductive layer or electrode layer and can be implemented as one of the opposing sensor plates or electrodes in a capacitor. When disposed opposite to a surface of the finger, the capacitive sensing layer 100 and the surface of the finger (e.g., a ridge or a valley of the finger) form the two opposing plates of a capacitor. The capacitive sensing layer 100 can include a metal layer within an integrated circuitry (IC) layout, which forms a capacitor C1 with a ground terminal. Over the capacitive sensing layer 100, a passivation layer (not illustrated in FIG. 1) is usually disposed to cover the capacitive sensing layer 100, for receiving a touch of a user. The passivation layer can be the protective film or cover layer 6 shown in FIG. 1A. In some implementations, e.g., under the glass configuration, the passivation layer is a top cover glass of an electronic device that function to protect the sensor chip 2 and act as the dielectric layer. The passivation layer can include insulating materials such as a glass, a sapphire, a plastic or a polymer, etc.

When a finger of the user approaches the capacitive sensing layer 100, a capacitance value of the capacitor C1 varies accordingly. The layout layer 106 can be a poly layer of conductive (e.g., metal) layers utilized for IC layout. The layout layer 106 forms a capacitor Cp2 with a signal ground terminal. The signal ground terminal is not limited to a system ground terminal with 0 voltage. A terminal or a layout layer receiving a fixed voltage is considered as a signal ground terminal. The capacitor Cp2 can be a parasitic capacitor between the layout layer 106 and another layout layer, or include a capacitor coupled between the layout layer 106 and the signal ground terminal. The voltage generators 102 and 104 can generate drive voltages V1 and V2. The switching network 108 includes switches S1 and S2. The switches S1 and S2 are connected in series, and the capacitive sensing layer 100 is electrically coupled between the switches S1 and S2. The switching network 110 includes switches S3 and S4. The switches S3 and S4 are connected in series, and the layout layer 106 is electrically coupled between the switches S3 and S4.

The switches S1 and S2 can be controlled by a clock signal or other control signals, such that the switching network 108 turns on an electrical connection between the voltage generator 102 and the capacitive sensing layer 100 by switching on the switch S1 and turns off an electrical connection between the capacitive sensing layer 100 and the output terminal N by switching off the switch S2 during a first period. During a second period, the switching network 108 turns off the electrical connection between the voltage generator 102 and the capacitive sensing layer 100 by switching off the switch S1 and turns on the electrical connection between the capacitive sensing layer 100 and the output terminal N by switching on the switch S2. Thus, switch S1 operates as a charging switch and switch S2 operates as a charge sensing switch to synchronously charge and sense capacitor C1 associated with the capacitive sensing layer 100 during respective time periods.

Similarly, the switches S3 and S4 can be controlled by a clock signal or other control signals, such that the switching network 110 turns on an electrical connection between the voltage generator 104 and the layout layer 106 by switching on switch S3 and turns off an electrical connection between the layout layer 106 and the output terminal N by switching off switch S4 during the first period. During the second period, the switching network 110 turns off the electrical connection between the voltage generator 104 and the layout layer 106 by switching off switch S3 and turns on the electrical connection between the layout layer 106 and the output terminal N by switching on switch S4. Thus, switch S3 operates as a charging switch and switch S4 operates as a charge sensing switch to synchronously charge and sense capacitor Cp2 associated with the integrated circuit layout layer 106 during respective time periods.

The switching networks 108 and 110 can adequately charge the capacitors C1 and Cp2 using the voltage generators 102 and 104, and output the charging result through the output terminal N to enhance an accuracy of fingerprint identification. In addition, the voltage generators 102 and 104 can vary the voltages generated V1 and V2 to enhance the accuracy of fingerprint identification.

For example, the capacitor C1 formed between the capacitive sensing layer 100 and the ground terminal can include a parasitic capacitor Cp1 formed between the capacitive sensing layer 100 and the ground terminal, and a touch sensing capacitor Cf formed when the user's finger (e.g., a ridge of the finger) is touching the passivation layer over the capacitive sensing layer 100. The capacitor C1 represents an equivalent capacitor between the capacitive sensing layer 100 and the ground terminal, which is a combination of the parasitic capacitor Cp1 and the touch sensing capacitor Cf connected in parallel (i.e., C1=Cp1+Cf). When the user's finger is not in contact with the passivation layer over the capacitive sensing layer 100, the capacitance value of the touch sensing capacitor Cf is substantially 0, and when the user's finger touches the passivation layer over the capacitive sensing layer 100, the touching capacitor Cf has a nonzero capacitance value that depends on the spacing from the capacitive sensing layer 100. Therefore, the capacitance value of the capacitor C1 varies according to whether the user's finger touches the passivation layer over the capacitive sensing layer 100 and the local spacing between a location on the touched part of the finger and the layer 100. When the finger of the user touches the passivation layer over the capacitive sensing layer 100, the capacitance value of the touch sensing capacitor Cf varies from one part of the finger to another part according to a distance between the portion of the finger (e.g., a ridge of the finger) touching the passivation layer over the capacitive sensing layer 100 and the capacitive sensing layer 100. This variation in the touch sensing capacitor Cf is captured by the array of sensor pixels and the output of the array of sensor pixels provides a map representing the surface profile of the touched portion of the finger and thus can be used to reconstruct the fingerprint pattern. This reconstruction based on the spatial variation in the touch sensing capacitor Cf can be achieved by the subsequent signal processing circuitry. A fingerprint identification system that implements structures and functions substantially equivalent to the sensor chip 2 in FIG. 1B includes a signal processing unit (e.g., substantially similar to the signal processing unit 5 of the sensor chip 2) in communication with the sensor pixel circuitry (e.g., substantially similar to the array 3 of sensor pixels) can sense the capacitance variation of the touch sensing capacitor Cf, and determine a location of the capacitive sensing layer 100 corresponds to a ridge or valley of the finger touching the passivation layer over the capacitive sensing layer 100.

Figure 3:
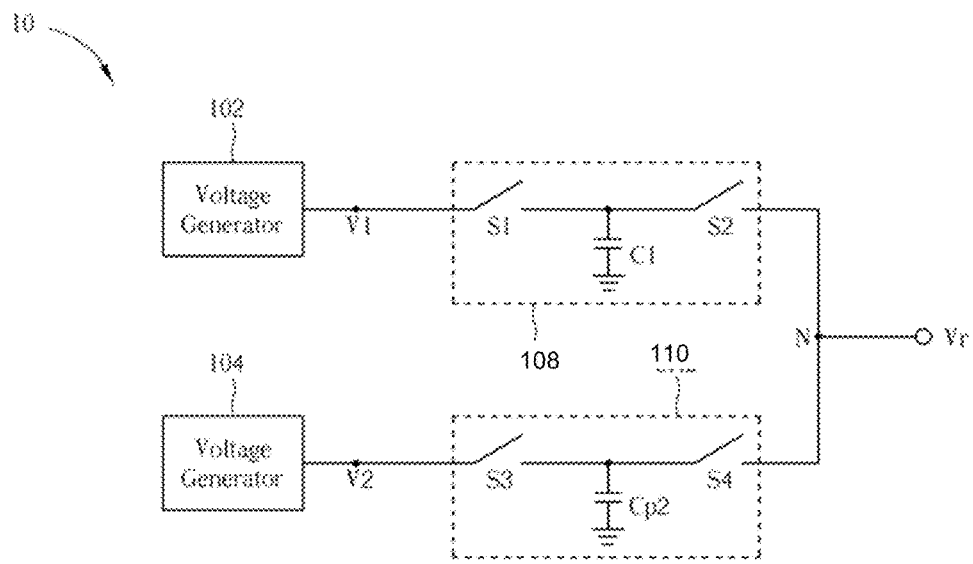
FIG. 3 is a schematic diagram of an equivalent circuitry of the sensor pixel circuitry in FIG. 1.

FIG. 3 is a circuit diagram showing an exemplary circuit equivalent of the sensor pixel circuitry 10. The switches S1 through S4 are controlled by a clock signal to control the on-off states of the switches. The switches S2 and S4 are turned off when the switches S1 and S3 are turned on, and the switches S2 and S4 are turned on when the switches S1 and S3 are turned off. During the first period when switches S1 and S3 are turned on and switches S2 and S4 are turned off, voltage V1 charges capacitor C1, and voltage V2 charges capacitor Cp2. During the second period when switches S1 and S3 are turned off and switches S2 and S4 are turned on, the capacitor C1 exchanges electric charges with capacitor Cp2 to form a resulting voltage Vr at the output terminal N. Moreover, a voltage value of the resulting voltage Vr can be represented using the following equations:

$$Vr = \frac{V1C1 + V2Cp2}{C1 + Cp2}.$$

Therefore, the sensor pixel circuitry 10 can output the resulting voltage Vr to a signal processing unit of a fingerprint identification system to determine whether the location of the sensor pixel circuitry 10 corresponds to a ridge or a valley of the fingerprint according to the resulting voltage Vr.

Figure 4:
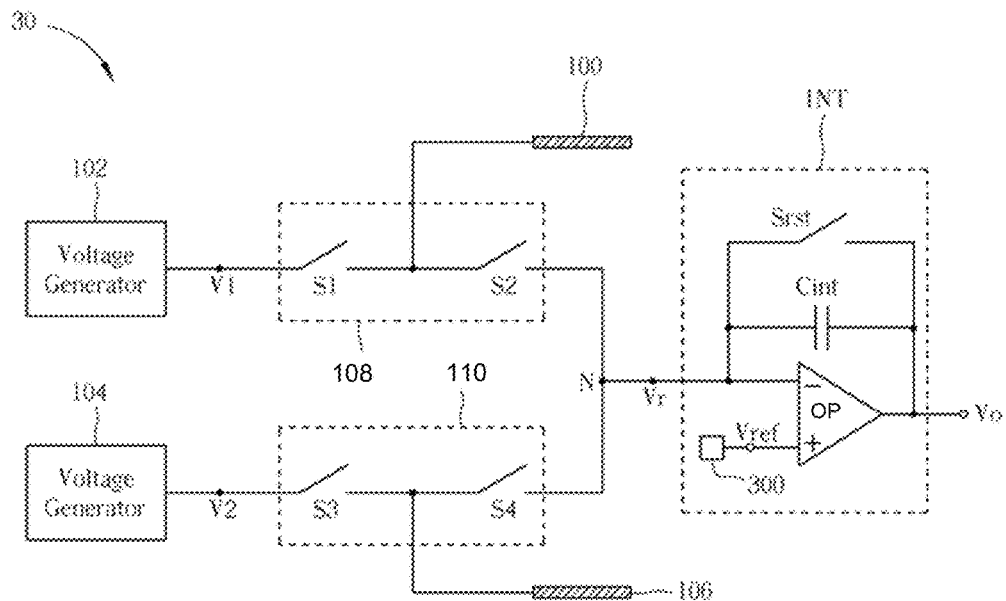
FIG. 4 is a schematic diagram of exemplary sensor pixel circuitry with in-pixel integrator.
Figure 5:
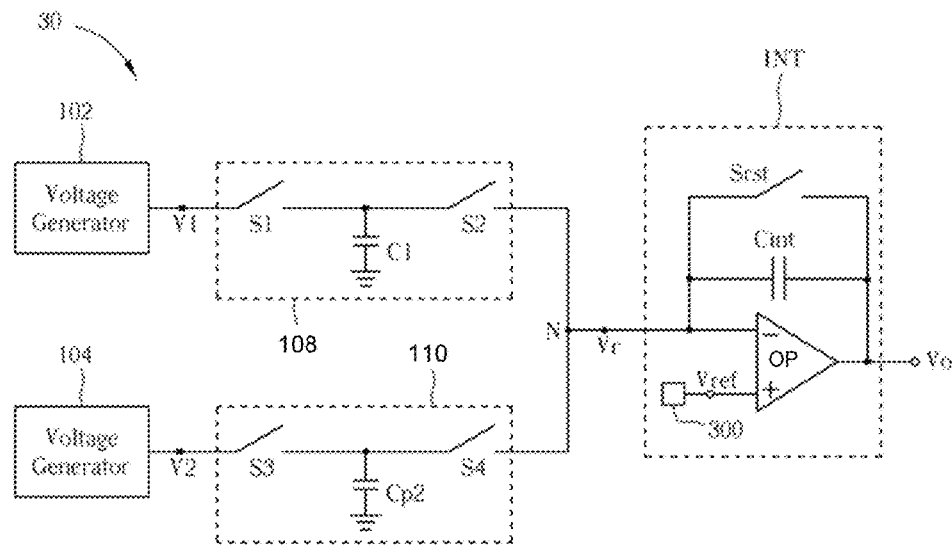
FIG. 5 is a schematic diagram of an equivalent circuitry of the sensor pixel circuitry in FIG. 4.

FIG. 4 is a schematic diagram of an exemplary sensor pixel circuitry 30 according to an embodiment of the disclosed technology. FIG. 5 is a schematic diagram of an equivalent circuitry of the sensor pixel circuitry 30. The sensor pixel circuitry 30 is substantially similar to the sensor pixel circuitry 10. Different from the sensor pixel circuitry 10, the sensor pixel circuitry 30 includes an integrator INT electrically coupled to the output terminal N, for storing the electric charges V1*Cf caused by ridges and valleys touching the passivation layer over the capacitance sensing layer 100. The inclusion of the integrator INT enhances the signal-to-noise ratio (SNR). The integrator INT includes a reference voltage generator 300, an amplifier OP, an integrating capacitor Cint and a reset switch Srst. The reference voltage generator 300 can generate a reference voltage Vref. The amplifier OP includes a positive input terminal electrically coupled to the reference voltage generator 300 for receiving the reference voltage Vref, a negative input terminal electrically coupled to the output terminal N for receiving the resulting voltage Vr, and an output terminal for outputting an output voltage Vo. The integrating capacitor Cint and the reset switch Srst are electrically coupled between the negative input terminal of the amplifier OP and the output terminal.

A capacitance value of the parasitic capacitor Cp1 within the capacitor C1 is usually larger than a capacitance value of the touch sensing capacitor Cf, which makes it difficult to identify a variation in the capacitance of the touch sensing capacitor Cf. The voltage value of the reference voltage Vref received by the negative input terminal of the amplifier OP in the sensor pixel circuitry 30 can be adjusted, such that the capacitance variation of the touch sensing capacitor Cf is more prominently identified through the integrator. In some implementations, the reference voltage Vref can be set as the resulting voltage Vr in absence of a finger touch from the user (i.e., Cf=0), which is represented by $$Vref = \frac{V1Cp1 + V2Cp2}{Cp1 + Cp2}.$$

In absence of the finger touch, the total electric charges accumulated by the capacitor C1 and the capacitor Cp2 during the first period are larger than Vref*(Cp1+Cp2), and there are electric charges to be stored in the integrating capacitor Cint. When the electric charges stored in the integrating capacitor Cint are mostly attributed to the touch sensing capacitor Cf, the output voltage Vo reflects the capacitance value of the touch sensing capacitor Cf more prominently. Adequately designing the reference voltage Vref can reduce or even eliminate the effect of the parasitic capacitor Cp1 on the determination of the capacitance value of the touch sensing capacitor Cf.

In various circuitry designs, the capacitance values of the capacitors Cp1 and Cp2 may not be easily acquired. In some implementations, when the capacitance values of the capacitors Cp1, Cp2 are assumed to be equal, the reference voltage Vref can be set as Vref=½(V1+V2). At least one of the voltages V1, V2, Vref can be generated by the voltage generators 102 and 104. The reference voltage generator 300 can be adjusted to provide $V1*Cp1+V2*Cp2=Vref*(Cp1+Cp2)$, which can help to eliminate the capacitance mismatch of the capacitors Cp1 and Cp2 caused by the fabrication process. By changing the voltage V1 generated by the voltage generator 102, the capacitance mismatch of the capacitors Cp1 and Cp2 due to fabrication process can be substantially eliminated.

In various IC layouts, the capacitors Cp1 and Cp2 can be designed to have substantially equal capacitance value, the reference voltage Vref can be set as $Vref=\frac{1}{2}(V1+V2)$, and the voltage values of the voltages V1 and V2 can be adjusted to substantially eliminate the capacitance mismatch of the capacitors Cp1 and Cp2 due to fabrication.

As described above, by charging the capacitors C1 and Cp2 and outputting the charging result through the output terminal N, the sensor pixel circuitry of the disclosed technology can enhance the accuracy of fingerprint identification. Various modifications can be made to the above described sensor pixel circuitry (e.g., array of sensor pixels 3) and fingerprint identification system (e.g., sensor chip 2 that includes an array of sensor pixels 3 and a signal processing system 5). For example, to substantially eliminate the mismatch of the capacitors Cp1 and Cp2, at least one of the voltages V1, V2, and Vref generated by the voltage generators 102, 104, and the reference voltage generator 300 can be adjusted. To adjust at least one of the voltages, a digital to analog converter (DAC) can be used to output a variable voltage. For example, in some implementations, the voltage generator 102 can include a DAC, which is controlled to output the voltage V1 with a variable voltage value. In some implementations, the voltage generator 104 can include a DAC, which is controlled to output the voltage V2 with a variable voltage value. In some implementations, the reference voltage generator 300 can include a DAC, which is controlled to output the reference voltage Vref with a variable voltage value.

Figure 6:
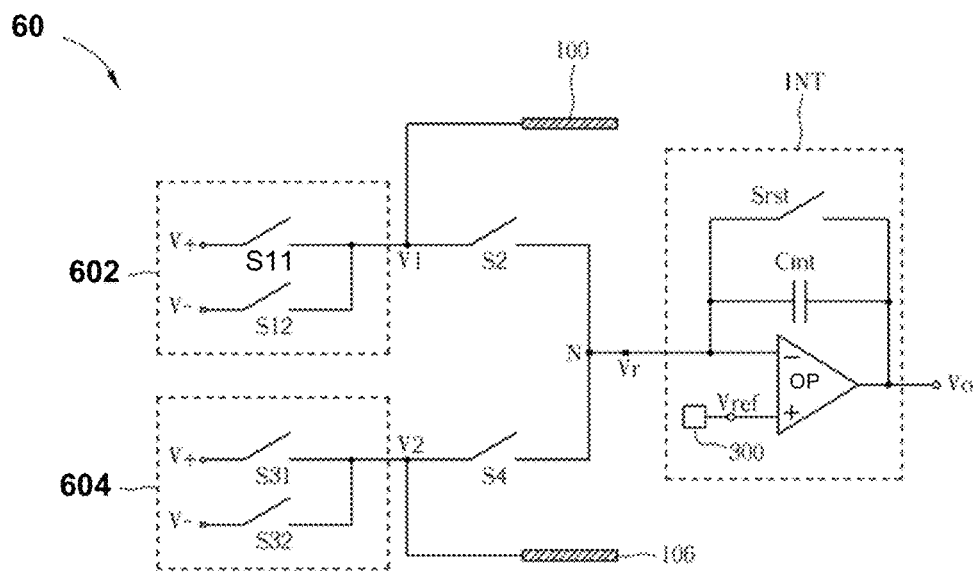
FIG. 6 is a schematic diagram of an exemplary sensor pixel circuitry.

In addition to the DAC, a switch adjusting mechanism can be provided to generate the controllable or variable voltages V1 and V2. FIG. 6 is a schematic diagram of an exemplary sensor pixel circuitry 60 according to an embodiment of the disclosed technology. In one implementation, the sensor pixel circuitry 60 can be substantially similar to the sensor pixel circuitry 30. The sensor pixel circuitry 60 utilizes electric charge supplying modules 602 and 604 to function as the voltage generators 102 and 104 of the sensor pixel circuitry 30 in FIGS. 2, 3 4 and 5. The electric charge supplying module 602 is electrically coupled between the switch S2 and the capacitive sensing layer 100. The electric charge supplying module 604 is electrically coupled between the switch S4 and the layout layer 106. The electric charge supplying module 602 includes the switches S11 and S12 electrically coupled to a voltage $V_+$ and a voltage $V_-$, respectively. Similarly, the electric charge supplying module 604 includes the switches S31 and S32 electrically coupled to a voltage $V_+$ and a voltage $V_-$, respectively. By controlling the on-off states of the switches S11, S12, S31, and S32, the controllable or variable voltages V1 and V2 can be generated to change the amount of electric charge stored in the capacitors C1 and Cp2, and substantially eliminate a capacitance mismatch of the capacitors Cp1 and Cp2 due to the fabrication process.

Figure 7:
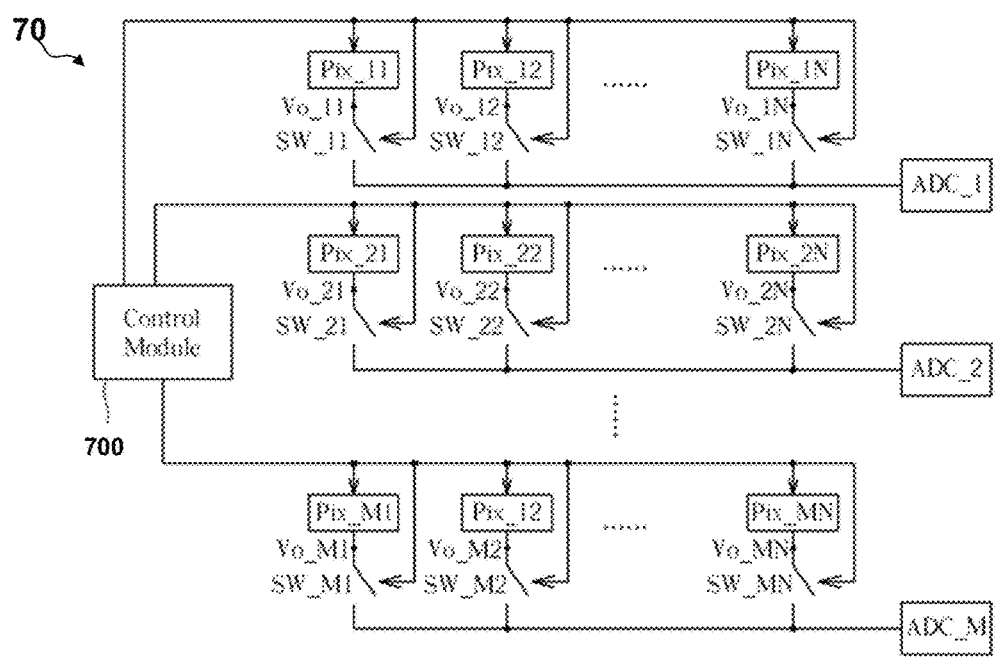
FIG. 7 is a schematic diagram of an exemplary fingerprint identification system.
Figure 8:
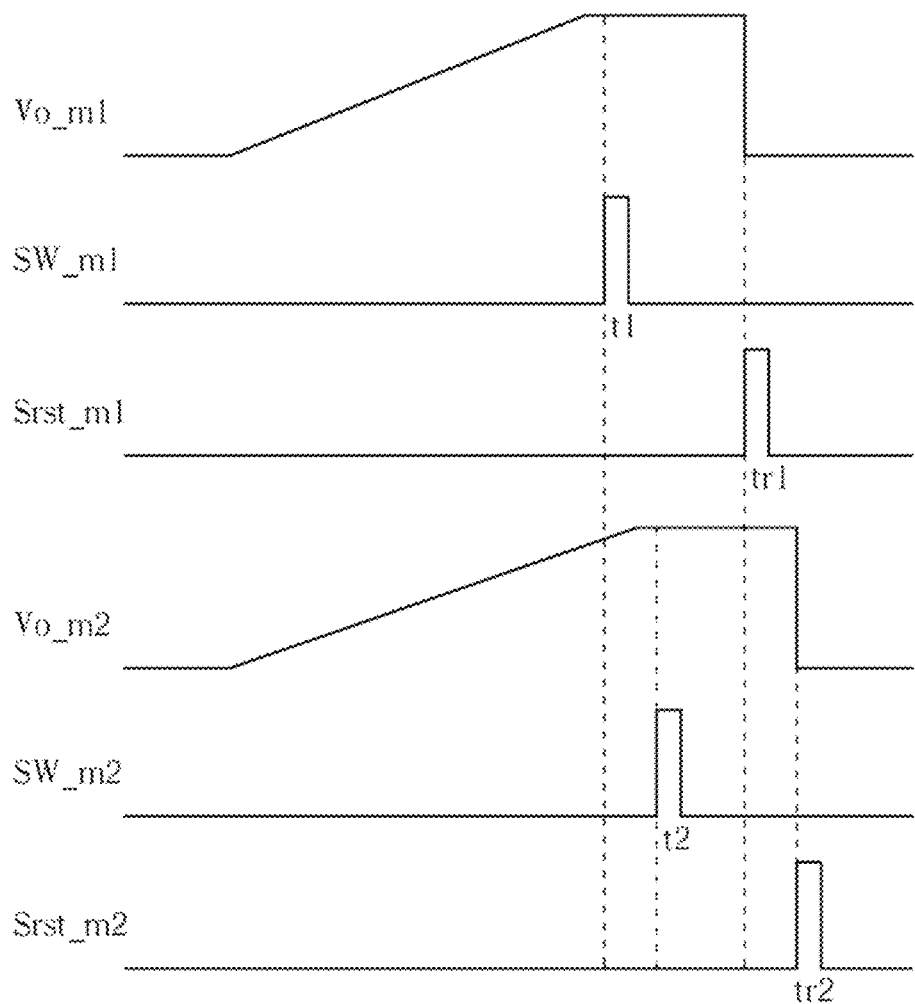
FIG. 8 is a schematic diagram illustrating exemplary waveforms of associated signals.

FIGS. 7 through 8 illustrate exemplary embodiments of a fingerprint identification system using an exemplary sensor pixel array arrangement to detect a presence of a ridge or valley of a finger at a specific location of the single sensor pixel circuitry. Proper arrangement of the sensor pixel circuitry in a fingerprint identification system can assist in identification of a user's fingerprint.

FIG. 7 is a schematic diagram of an exemplary fingerprint identification system 70. The fingerprint identification system 70 is an implementation of the sensor chip 2 that combines the structures and functions of the array 3 of sensor pixels in electrical communication with the signal processing system 5 as shown in FIG. 1B. The fingerprint identification system includes an array of sensor pixel circuitry Pix_11 through Pix_MN, corresponding enable switches SW_11 through SW_MN, corresponding analog to digital converters ADC_1 through ADC_M and a control module 700. The sensor pixel circuitry Pix_11 through Pix_MN are arranged in an exemplary array configuration. For example, the array of sensor pixel circuitry Pix_11 through Pix_MN are arranged in M rows and N columns. Each sensor pixel circuitry corresponds to and electrically coupled to an enable switch, and a row of sensor pixel circuitry correspond to and electrically coupled to an analog to digital converter.

In one example configuration, the group (e.g., row or column) of sensor pixel circuitry Pix_11 through Pix_1N are electrically coupled to the analog to a corresponding digital converter ADC_1. Similarly, the group of sensor pixel circuitry Pix_21 through Pix_2N are electrically coupled to the analog to digital converter ADC_2. Remaining groups of sensor pixel circuitry can be similarly electrically coupled to corresponding analog to digital converters.

The array of sensor pixel circuitry Pix_11 through Pix_MN and the enable switches SW_11 through SW_MN are electrically coupled to the control module 700 for receiving control signals generated by the control module 700. Each sensor pixel circuitry of the array of sensor pixel circuitry Pix_11 through Pix_MN can be substantially similar to the sensor pixel circuitry 30 or 60 or any other configurations described in this patent document. Moreover, output voltages Vo_11 through Vo_MN are outputted by the integrators of the sensor pixel circuitry Pix_11 through Pix_MN. As described below in this patent document, multiple sensor pixel circuitry can share one integrator for various potential advantages including to save layout space and to simplify the design, for example. The operational principles and detail operations of each sensor pixel circuitry in the array of sensor pixel circuitry Pix_11 through Pix_MN can be substantially similar to the description of the sensor pixel circuitry 30 or 60 or any other configurations described in this patent document.

In the fingerprint identification system 70, the control module 700 controls the enable switches SW_11 through SW_MN, such that a conducting period of an enable switch corresponding to a given sensor pixel circuitry in the array of sensor pixel circuitry (e.g., Pix_11 through Pix_MN) and a conducting period of an enable switch corresponding to another sensor pixel circuitry of the same row of sensor pixel circuitry (e.g., Pix_11 through Pix_MN) can differ in time. For example, the control module 700 selectively turns on and off the switches SW_11 through SW_MN to selectively vary the conducting period of the different sensor pixel circuitry in the same row (e.g., Pix_11 through Pix_MN) for readout by ADC. The control module 700 can control the sensor pixel circuitry for the other rows in a similar manner. In some implementations, the control module 700 can turn on the enable switches of the array of sensor pixel circuitry substantially in parallel. For example, the control module 700 can enable SW11 through SWMN at substantially the same time, so that ADC 1-M can readout data in parallel. Also, the control module 700 can scan through one or more lines (e.g., rows, columns, or other groups) at a time to readout all of the pixel output voltage.

FIG. 8 illustrates examples of waveforms of various signals associated with a fingerprint identification system. Specifically, the example waves shown in FIG. 8 are associated with row M of the rows of sensor pixel circuitry in FIG. 7. An output of an integrator (e.g., integrator INT) is represented by the output voltage Vo_m1. The control signal of the enable switch SW_m1 pulls high at a time t1 for a time period, and the output voltage Vo_m1 is delivered to the analog to digital converter ADC_m through the enable switch SW_m1. At some time after t1, the control signal of the reset switch Srst pulls high at a time tr1, such that the integrating capacitor Cint of the sensor pixel circuitry Pix_m1 is return to zero, so as to be ready for performing another integration for a next time period. Also, at the same time as the integrator of the sensor pixel circuitry Pix_m1 performing integration, the integrator of the sensor pixel circuitry Pix_m2 also performs integration substantially simultaneously. Similarly, the control signal of the enable switch SW_m2 pulls high at a time t2 for a time period, and the output voltage Vo_m2 is delivered to the analog to digital converter ADC_m through the enable switch SW_m2. The time t2 is at some time after t1. Also, each of the sensor pixel circuitry Pix_m3 through Pix_mN can deliver the output voltages to the corresponding analog to digital converter ADC_m at different after time t2. The different time instances for sensor pixel circuitry Pix_m1 through Pix_mN may be non-overlapping time instances. The analog to digital converter ADC_m receives the output voltage of each sensor pixel circuitry in the row of the sensor pixel circuitry Pix_m1 through Pix_mN.

Each sensor pixel circuitry within the array of sensor pixel circuitry Pix_11 through Pix_MN includes a dedicated integrator. As such, the integration processes of the different sensor pixel circuitry in a given row of sensor pixel circuitry (e.g., Pix_m1 through Pix_mN) can be performed in parallel by the multiple integrators. With a fixed integration period for each integrator, the fingerprint identification system 70 can shorten an overall integration period for the array of sensor pixel circuitry. Due to the parallel integration of the sensor pixel circuitry of all sensor pixel circuitry in the entire array of sensor pixel circuitry Pix_11 through Pix_MN, the overall integration period for a row of sensor pixel circuitry can be fixed (e.g., at a period longer than individual sensor pixel circuitry integration period) to allow a longer integration period for each sensor pixel circuitry in the rows of sensor pixel circuitry Pix_m1 through Pix_mn. Because the individual integration processes can be performed in parallel for all pixel sensor circuitry, the overall integration period can be reduced even when the individual integration period is increased. Increasing the individual integration period, while reducing the overall integration period, can allow the noise to be sufficiently averaged, and the SNR of the sensor pixel circuitry can be further enhanced. Because each pixel integrator can act as a pixel level signal (voltage) storage, and the stored signal can be readout later by a scan readout process using the ADCs and control module, for example.

In operations, responsive to a finger touch (e.g., on a passivation layer over the fingerprint identification system), a selected subset or the entire array of sensor pixel circuitry can be enabled to integrate the selected subset or the entire array of sensor pixel circuitry. The integrating capacitor connected to the negative feedback path of each integrator can be used as a local memory to store the charges associated with the corresponding sensor pixel. Readout of the sensor pixel data can be performed per selected group or subset of the array of senor pixel circuitry, such as each row, column, etc. Readout process is a relatively quick compared to the integration process, and thus, parallel integration of the selected subset or the entire array of sensor pixel circuitry while the finger is touching the fingerprint identification system (e.g., the passivation layer over the sensor pixel circuitry) can be advantageous by not wasting the sensor pixel circuitry under the finger touch.

The implementations described above are for illustrative purpose and various modifications to one or more aspects of the sensor pixel circuitry and fingerprint identification system are possible. For example, in some implementations, the fingerprint identification system can apply an excitation signal directly to a finger via an electrode (e.g., a metal ring) to increase a voltage difference between two terminals of the touch sensing capacitor Cf, such that more electric charges are accumulated in the touch sensing capacitor Cf during the first period. Alternatively, the fingerprint identification system can apply a high voltage to the finger during the second period, such that more electric charges are stored in the integrating capacitor Cint.

Figure 9:
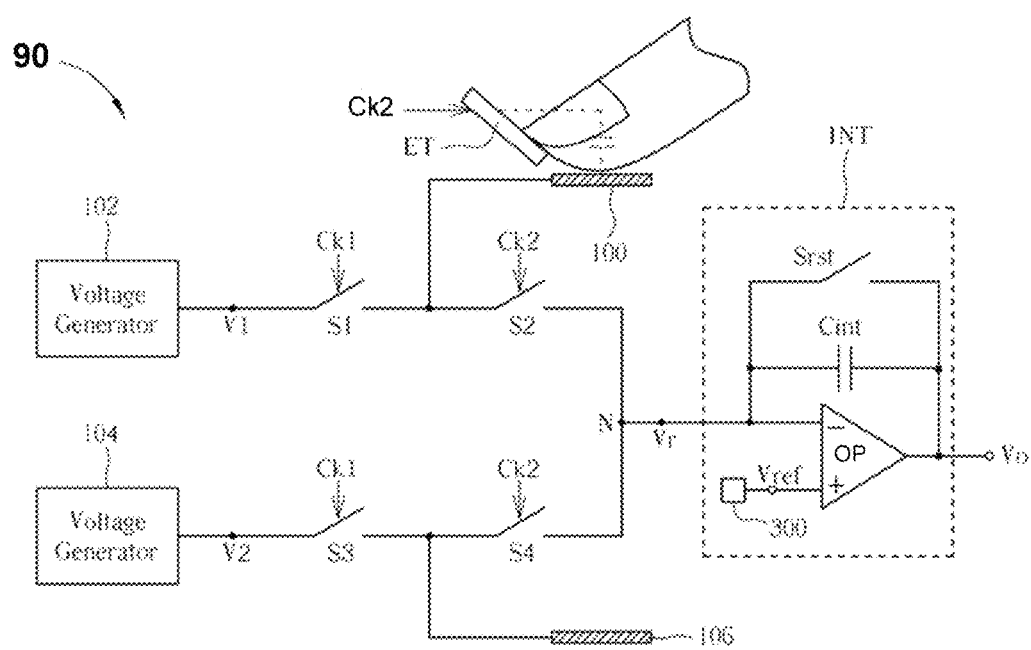
FIG. 9 is a schematic diagram of exemplary sensor pixel circuitry and an external electrode according to an embodiment of the present document.

FIG. 9 is a schematic diagram of an exemplary sensor pixel circuitry 90 and an external electrode Et. The sensor pixel circuitry 90 can be substantially similar to the sensor pixel circuitry 30 or 60. Different from the sensor pixel circuitry 30, the switches S1 and S3 are controlled by the clock signal ck1, and the switches S2 and S4 are controlled by the clock signal ck2. When the clock signal ck1 is high, the switches S1 and S3 are turned on. When the clock signal ck1 is low, the switches S1 and S3 are turned off. When the clock signal ck2 is high, the switches S2 and S4 are turned on. When the clock signal ck2 is low, the switches S2 and S4 are turned off. In addition, the external electrode Et can be electrically connected to the clock signal ck2, so as to pull high the voltage applied to the user's finger through the external electrode Et during the second period (i.e., the period when the switches S2 and S4 are turned on and the switches S1 and S3 are turned off). By applying the high voltage to the user's finger, more electric charges are stored in the integrating capacitor Cint through the touch sensing capacitor Cf during the second period, such that the fingerprint identification system can isolate and determine the capacitance of the touch sensing capacitor Cf more accurately.

Figure 10:
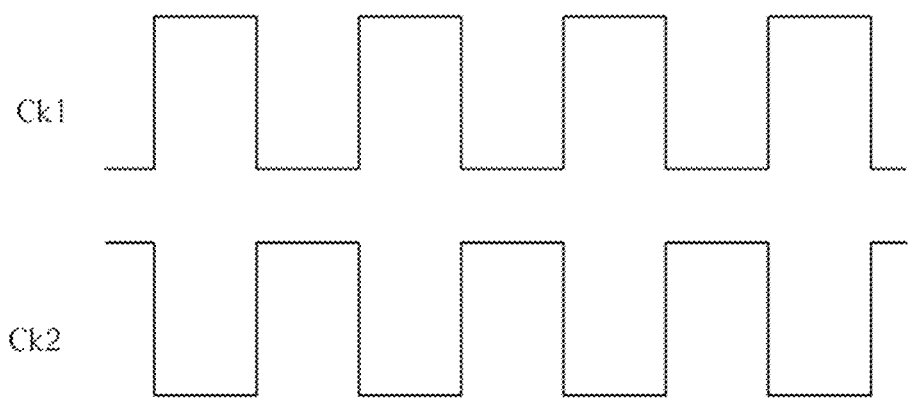
FIG. 10 is a schematic diagram illustrating waveforms of clock signals according to an embodiment of the present document.

FIG. 10 is a schematic diagram illustrating exemplary waveforms of clock signals ck1 and ck2. In the example shown in FIG. 10, the clock signals ck1 and ck2 are inverted and out of phase with each other. When ck1 is set high, ck2 is set low.

Other modifications are possible. For example, in the fingerprint identification system 70, a row of sensor pixel circuitry (e.g., Pix_m1 through Pix_mN) are couple to a corresponding analog to digital converter (e.g., ADC_m). In some implementations, the sensor pixel circuitry units can be divided into different groups of sensor pixel circuitry. All sensor pixel circuitry in a given group can be electrically coupled to the same corresponding analog to digital converter. The groups of sensor pixel circuitry can be determined using rows, columns, a predetermined number of sensor pixel circuitry, a particular shape (e.g., a square) or other groupings that allow an enable switch corresponding to a sensor pixel circuitry in one group to have a different conducting period than another enable switch corresponding to a sensor pixel circuitry in a different group.

Figure 11:
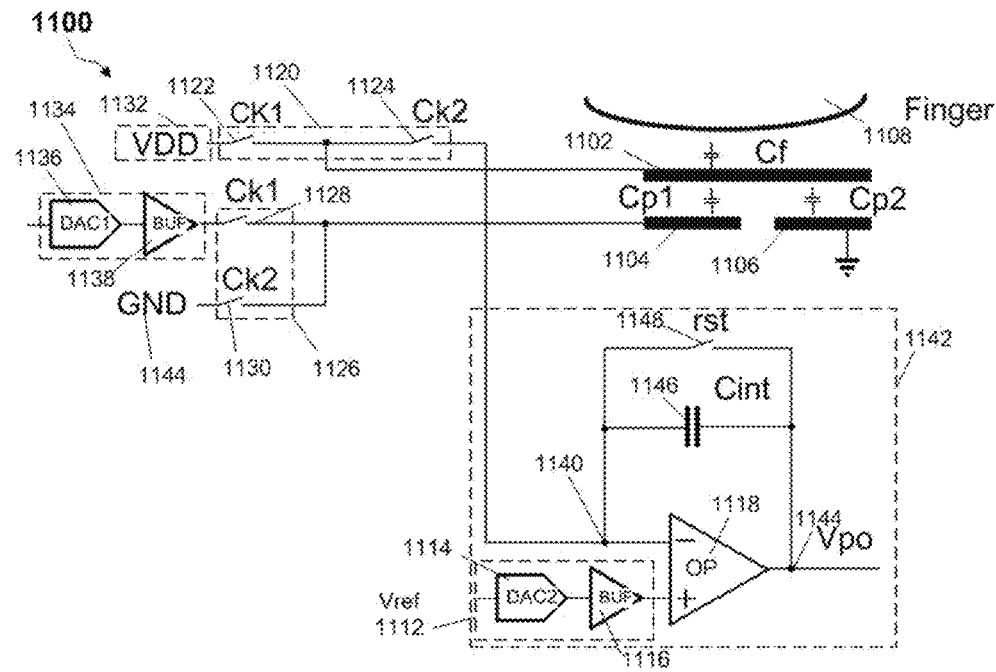
FIG. 11 is a schematic diagram illustrating yet another exemplary sensor pixel circuitry to compensate for capacitor mismatch in a fingerprint identification system.
Figure 12:
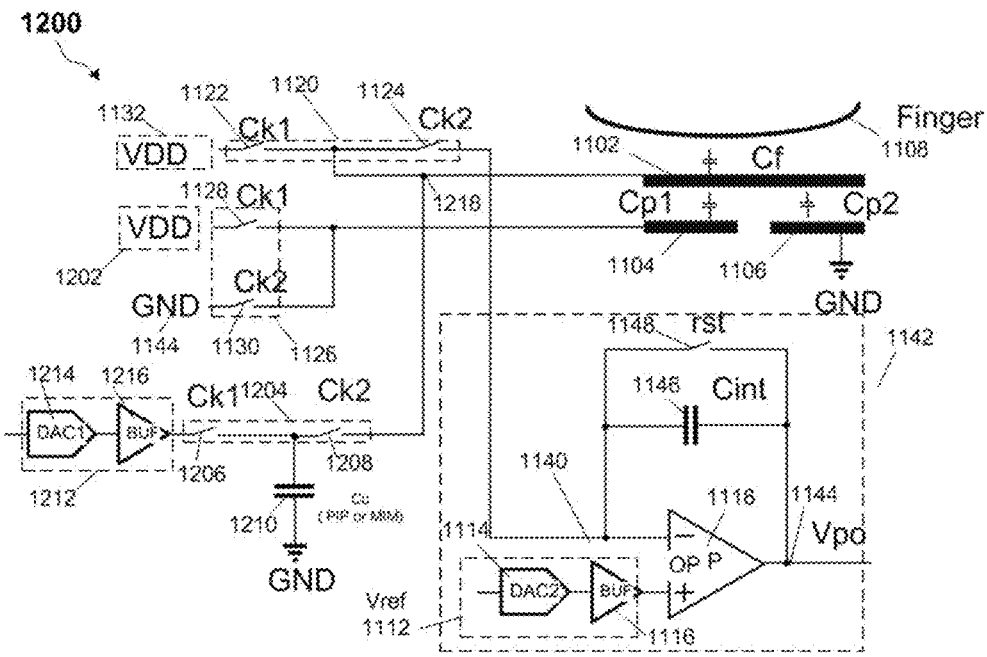
FIG. 12 is a schematic diagram illustrating yet another exemplary sensor pixel circuitry to compensate for capacitor mismatch in a fingerprint identification system.
Figure 13:
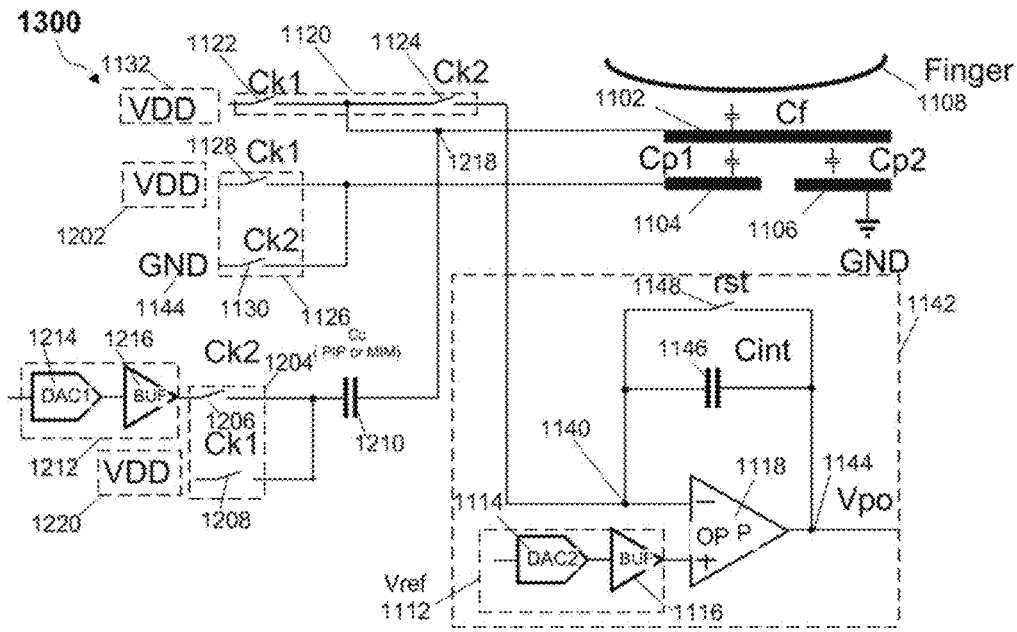
FIG. 13 is a schematic diagram illustrating yet another exemplary sensor pixel circuitry to compensate for capacitor mismatch in a fingerprint identification system.

Additional examples of modifications to the sensor pixel circuitry are shown FIGS. 11, 12 and 13.

FIG. 11 is a diagram showing another exemplary sensor pixel circuitry 1100 for compensating for capacitor mismatch in a fingerprint identification system. The exemplary sensor pixel circuitry can include a sensor plate or a capacitive sensing layer 1102 that can operate or function as one of two opposing conductive plates of a fingerprint associated capacitor. For example, when a finger 1108 of a user approaches the sensor plate or capacitive sensing layer 1102, a surface of the finger 1108 and the sensor plate of capacitive sensing layer 1102 can operate or function as the two opposing plates of capacitor Cf. The capacitance of the capacitor Cf can vary based at least partly on a distance between the surface of the finger (e.g., a ridge) and the sensor plate or capacitive sensing layer 1102. The sensor plate or capacitive sensing layer 1102 can include a conductive material, such as one of various metals. A voltage generator 1132 is electrically connected to the sensor plate 1102, which is electrically connected to a system ground through the surface of the finger 108. The voltage generator can generate drive voltage VDD for charging the fingerprint associated capacitor Cf. A switching circuitry, such as a switching network 1120 includes switches 1122 and 1124 in series for being switchable in electrically connecting the sensor plate 1102 to the voltage generator 1132 and an output terminal 1140. In some implementations, the switching circuitry 1120 can be implemented using sample-and-hold circuitry.

The switches 1122 and 1124 can be controlled by a clock signal or other control signals, such that the switching circuitry 1120 can turn on an electrical connection between the voltage generator 1132 and the sensor plate 1102 by turning on the switch 1122 and turn off an electrical connection between the sensor plate 1102 and the output terminal 1140 by turning off the switch 1124 during a first period. During a second period, the sample-and-hold circuitry 1120 can turn off the electrical connection between the voltage generator 1132 and the sensor plate 1102 by turning off the switch 1122 and turn on the electrical connection between the sensor plate 1102 and the output terminal 1140 by turning on the switch 1124. Thus, switch 1122 operates as a charging switch and switch 1124 operates as a charge sensing switch to synchronously charge and sense capacitor Cf associated with the sensor plate 1102 during respective time periods.

Two substantially identical conductive layers, electrodes or plates 1104 and 1106 can be disposed below the sensor plate 1102. The conductive plate 1104 and the sensor plate 1102 can form a corresponding capacitor CP1. The conductive plate 1106 and the sensor plate 1102 can form a corresponding capacitor CP2.

When the two conductive plates 1104 and 1106 are substantially identical, the respective capacitors CP1 and CP2 can share a substantially similar capacitance. A switching circuitry, such as a switching network 1126 can include switches 1128 and 1130 to switchable between electrically connecting the conductive plate 1104 to a voltage generator 1134 and ground 1144. The other conductive plate 1106 is electrically connected to ground and not electrically controlled by the switching circuitry 1126. The voltage generator 1134 can include a DAC1 1136 and a voltage buffer 1138 to generate and provide a variable voltage to the conductive plates 1104. In some implementations, the switching circuitry 1126 can be implemented using sample-and-hold circuitry.

The switches 1128 and 1130 can be controlled by a clock signal or other control signals, such that the switching circuitry 1126 can turn on an electrical connection between the voltage generator 1134 and the conductive plate 1104 by turning on the switch 1128 and turn off an electrical connection between the conductive plate 1104 and the ground 1144 by turning off the switch 1130 during a first period. During a second period, the switching circuitry 1126 can turn off the electrical connection between the voltage generator 1134 and the conductive plate 1104 by turning off the switch 1128 and turn on the electrical connection between the conductive plate 1104 and the ground 1144 by turning on the switch 1130. Thus, switch 1128 operates as a charging switch and switch 1130 operates as a grounding switch to synchronously charge and ground capacitor CP1 associated with the sensor plate 1102 during respective time periods.

In some implementations, the output terminal 1140 can be optionally electrically connected to an integrator 1142 for storing the electric charges caused by ridges and valleys of a finger touching the passivation layer over the sensor plate 1102. The inclusion of the integrator INT enhances the signal-to-noise ratio (SNR). The integrator includes an amplifier 1118 having a negative input electrically connected to the output terminal 1140 connected to the switching circuitry 1120. The amplifier 1118 has a positive input electrically connected to a reference voltage generator 1112 for receiving the reference voltage Vref. The reference voltage generator 1112 can include a DAC2 1114 and a voltage buffer 1116 for generating and providing a variable reference voltage. The amplifier 1118 includes an output terminal 114 for outputting an output voltage Vpo. An integrating capacitor Cint 1146 and a reset switch rst 1148 are electrically coupled in parallel between the negative input terminal of the amplifier OP 1118 and the output terminal 1144.

When the two conductive plates 1104 and 1106 are substantially similar, the DAC1 1136 output can be set to VDD. During the first period CK1, the switches 1122 and 1128 are turned on and switches 1124 and 1130 are turned off. The charge in CP2 will be Cp2*VDD and the charge in CP1 will be 0. During the second period CK2, switches 1122 and 1128 are turned off and switches 1124 and 1130 are turned on. During the second period, the charges in CP1 and CP2 will exchange. When a finger is not touching a passivation layer over the sensor plate 1102, the charge in Cf is substantially zero, and the voltage at the negative input of the amplifier OP 1118 will be VDD/2. Because the two conductive plates 1104 and 1106 can be substantially the same due to the identical layout, the DAC1 might be not necessary or become optional. By removing the DAC1, the DAC1 noise will no longer exist in the pixel output, which further enhances the SNR.

Also, the mismatch between parasitic capacitors CP1 and CP2 can be compensated using techniques illustrated and described with respect to FIGS. 12 and 13. FIG. 12 is a diagram showing yet another exemplary sensor pixel circuitry 1200 for compensating for capacitor mismatch in a fingerprint identification system. The sensor pixel circuitry 1200 is substantially similar to the sensor pixel circuitry 1100 with some variations. For example, the switching circuitry 1126 is electrically connected between the conductive plate 1104 and a voltage generator 1202 that does not include a DAC. The output of the voltage generator 1202 preset to VDD. In addition, a third voltage generator 1212 is electrically connected to another switching circuitry 1204. The third voltage generator 1212 can include a DAC 1214 DAC1 in series with a voltage buffer 1216.

The switching circuitry 1204 includes switches 1206 and 1208 in series for being switchable in electrically connecting a capacitor 1210 Cc between the voltage generator 1212 and a common node 1218 connecting to the sensor plate 1102 and the switching circuitry 1120 (which is switchable in electrically connecting to the output terminal 1140 and the voltage generator 1132). The other terminal of the capacitor 1210 Cc is electrically connected to ground. See relevant description of FIG. 11 for the circuit components of the sensor pixel circuitry 1200 that are similar to the sensor pixel circuitry 1100.

In the sensor pixel circuitry 1200, the final voltage VPO at the output terminal 1144 without a finger touching a passivation layer over the sensor electrode 1102 during the second period is (CP1*VDD+Cc*VDAC)/(Cc+Cp1+Cp2). When the two conductive plates 1104 and 1106 are substantially similar, VDAC is set to VDD/2. When two conductive plates 1104 and 1106 are not substantially similar, VDAC is adjusted.

FIG. 13 is a diagram showing yet another exemplary sensor pixel circuitry 1300 for compensating for capacitor mismatch in a fingerprint identification system. The sensor pixel circuitry 1300 is substantially similar to the sensor pixel circuitry 1200 with some variations. For example, the switching circuitry 1204 includes switches 1206 and 1208 electrically connected in series for selectively electrically connecting the capacitor Cc 1210 to the voltage generator 1202 and a fourth voltage generator 1220. The voltage generator 1220 can be set to VDD. The other terminal of the capacitor Cc 1210 is electrically connected to a common node 1218 connecting to the sensor plate 1102 and the sample-and-hold circuitry 1120 (which is switchable in electrically connecting to the output terminal 1140 and the voltage generator 1132). See descriptions of FIG. 12 for the corresponding descriptions of the circuit components of the sensor pixel circuitry 1300 that are similar to the sensor pixel circuitry 1200.

In the sensor pixel circuitry 1300, the final voltage VPO at output terminal 1144 without a finger touch during the second period Ck2 is (CP1*VDD+Cc*Vdac)/(Cc+Cp1+Cp2). When two conductive plates 1104 and 1106 are not substantially similar, VDAC is adjusted.

In some implementations, an integrator can be shared between a number of sensor pixel circuitry units to reduce the total number of integrators in the fingerprint identification system, which can provide a number potential advantages including cost reduction, layout size reduction, and simplicity in design, for example. Multiple units of sensor pixel circuitry can share an integrator by multiplexing the output signals from a selected number of sensor pixel circuitry units into a shared integrator. For example, when grouping the array of sensor pixel circuitry units into rows, with each row assigned to an ADC, each sensor pixel circuitry unit in a row can share an integrator with one or more sensor pixel circuitry units in one or more rows of sensor pixel circuitry. When grouping the sensor pixel circuitry in the array of sensor pixel circuitry into columns, each sensor pixel circuitry in a given column can share an integrator with one or more sensor pixel circuitry in one or more columns.

Figure 14A:
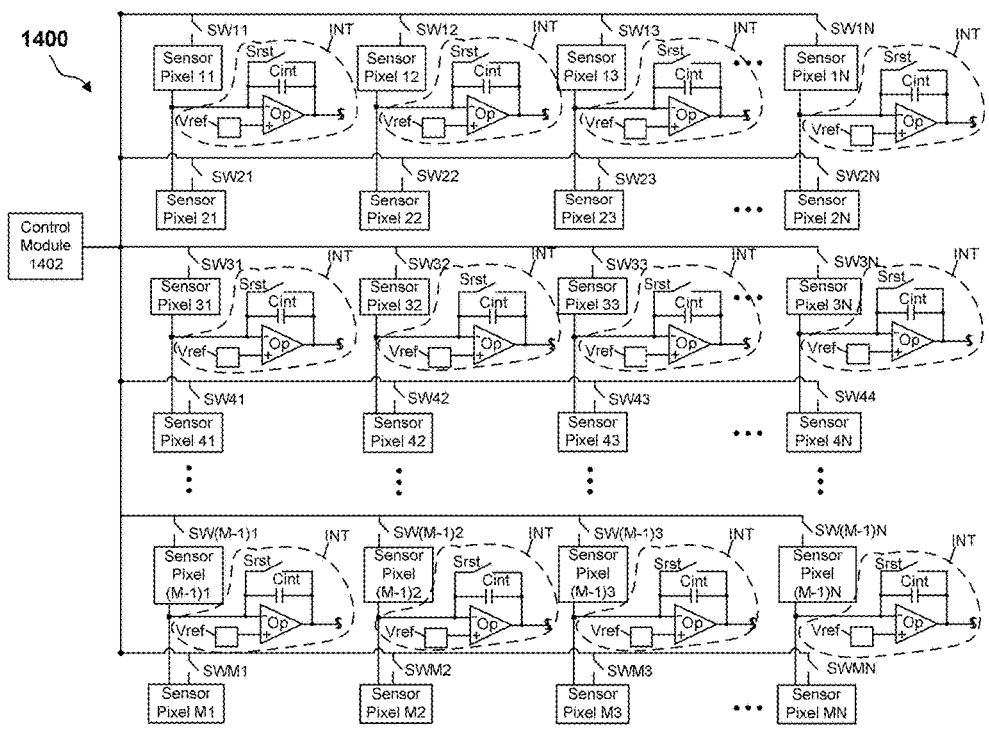
FIG. 14A is a schematic diagram illustrating an exemplary fingerprint identification system for sharing integrators between sensor pixel circuitry.
Figure 14B:
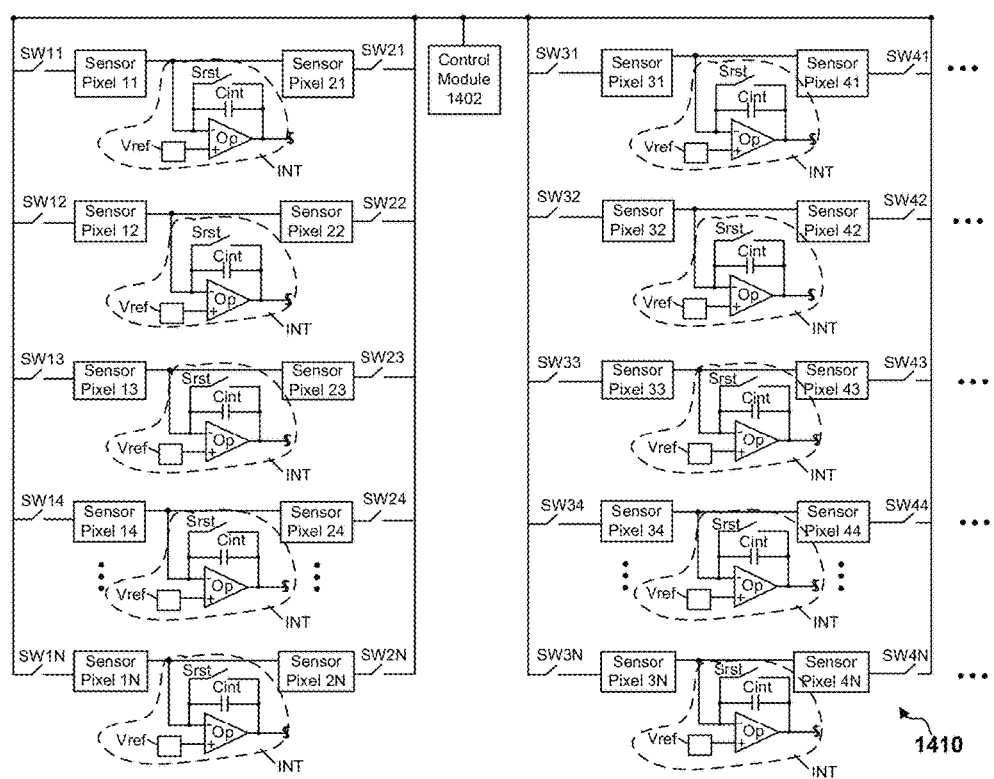
FIG. 14B is a schematic diagram illustrating another exemplary fingerprint identification system for sharing integrators between sensor pixel circuitry.

FIGS. 14A and 14B show examples of configurations for sharing integrators between sensor pixel circuitry units.

FIG. 14A is a diagram showing an example of a fingerprint identification system 1400 for integrator sharing between rows in an array of sensor pixel circuitry units. The fingerprint identification system 1400 includes a control module 1402, which can be substantially similar to the control module 700 in FIG. 7. An array of sensor pixel circuitry Sensor Pixel 11 through Sensor Pixel MN are grouped into rows 1 through M. Each row in the array includes N columns of sensor pixel circuitry. In the example shown in FIG. 14A, every two rows of sensor pixel circuitry share integrators. However, more than two rows of sensor pixel circuitry can share integrators. The control module 1402 can selectively enable/disable each sensor pixel circuitry in the array by turning on and off corresponding enable switches SW11 through SW MN. The switch signal can be one or multiple digital logic signals. By controlling the appropriate sensor pixel circuitry through the enable switches, the control module 1402 can integrate any number of sensor pixel circuitry in the array in parallel. In the example shown in FIG. 14A, the control module enables the odd row of sensor pixel circuitry (e.g., Sensor Pixel 11 through Sensor Pixel 1N) to integrate all sensor pixels in the row. The pixels in the odd row can perform integration in parallel, and after the integration is completed, control module can scan each pixels to readout their data using the ADCs. Then the control module can switch on the even row of sensor pixel circuitry (e.g., Sensor Pixel 21 through Sensor Pixel 2N), which can share the integrators used by the odd row of sensor pixel circuitry (e.g., Sensor Pixel 11 through Sensor Pixel 1N) to perform integration in parallel. All of the odd and even rows can be processed in similar manner. In some implementations, all odd rows can be processed at substantially the same time in parallel. Then all of the even rows can be processed at substantially the same time in parallel. In some implementations, any number of odd and even rows can be processed together in parallel. In addition, the even rows can be processed first in some implementations. Thus, the order of the even and odd rows is not limiting.

FIG. 14B is a diagram showing an exemplary fingerprint identification system 1410 for integrator sharing between columns in an array of sensor pixel circuitry. The fingerprint identification system 1410 includes a control module 1402, which can be substantially similar to the control module 700 in FIG. 7. An array of sensor pixel circuitry Sensor Pixel 11 through Sensor Pixel 4N are grouped into columns 1 through 4. While more than 4 columns can be included in an array, only 4 columns are shown in FIG. 14B for illustrative purposes. Each column in the array includes N rows of sensor pixel circuitry. In the example shown in FIG. 14B, every two columns of sensor pixel circuitry share integrators. However, more than two columns of sensor pixel circuitry can share integrators. The control module 1402 can selectively enable/disable each sensor pixel circuitry in the array by turning on and off corresponding enable switches SW11 through SW 4N. By controlling the appropriate sensor pixel circuitry through the enable switches, the control module 1402 can integrate any number of sensor pixel circuitry in the array in parallel. In the example shown in FIG. 14B, the control module enables the odd column of sensor pixel circuitry (e.g., Sensor Pixel 11 through Sensor Pixel 1N) to integrate all sensor pixels in the odd column. The sensor pixels in the odd column can perform integration in parallel, and after the integration completed, control module can scan each sensor pixel to readout the data using the ADCs. Then the control module can switch on the even column of sensor pixel circuitry (e.g., Sensor Pixel 21 through Sensor Pixel 2N), which can share the integrators used by the odd column of sensor pixel circuitry (e.g., Sensor Pixel 11 through Sensor Pixel 1N) to perform integration in parallel. All of the odd and even columns can be processed in similar manner. In some implementations, all odd columns can be processed at substantially the same time in parallel. Then all of the even columns can be processed at substantially the same time in parallel. In some implementations, any number of odd and even columns can be processed together in parallel. In addition, the even columns can be processed first in some implementations. Thus, the order of the even and odd columns is not limiting. Moreover in both FIGS. 14A and 14B, the array of sensor pixels can be grouped in a way different than rows or columns and the integrator sharing can be implemented in various ways depending on the grouping of the array of sensor pixels.

Figure 14C:
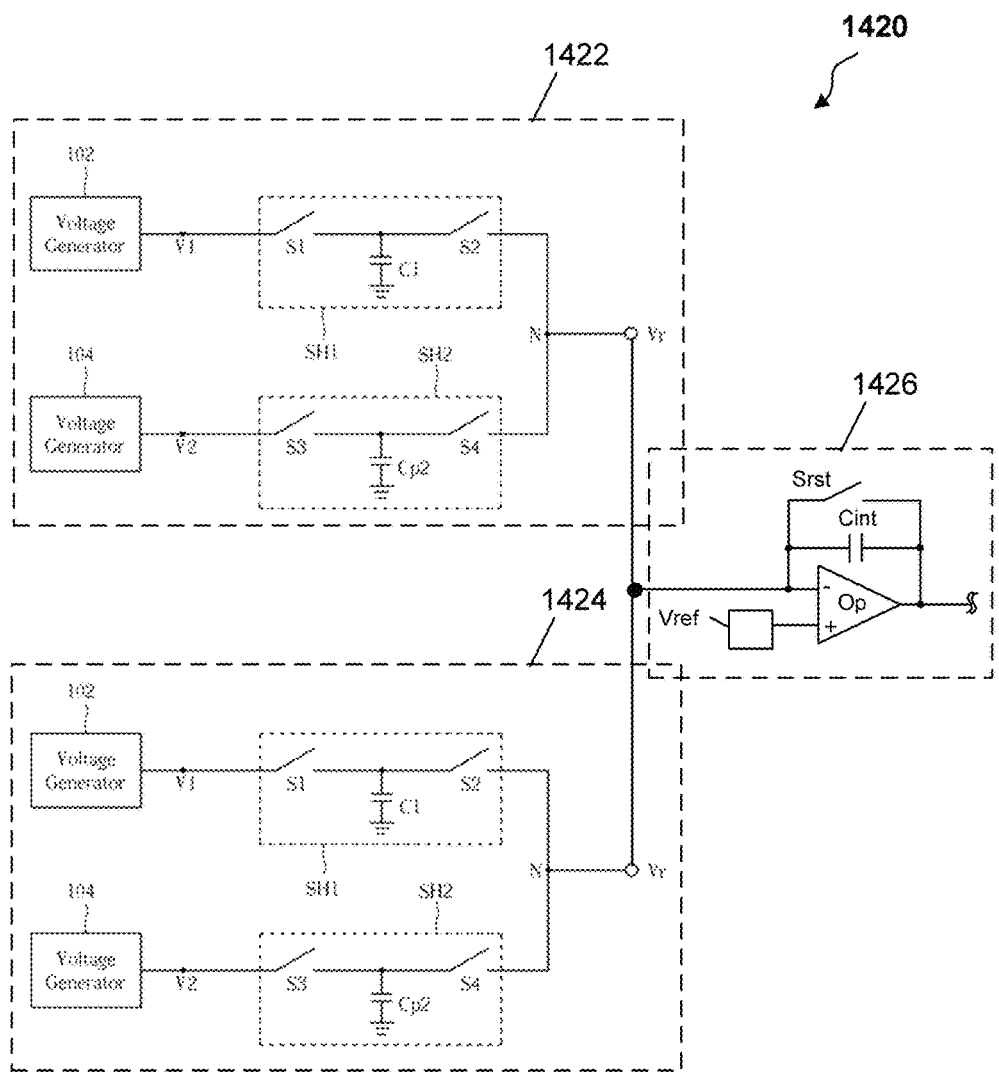
FIG. 14C is a schematic diagram illustrating an exemplary fingerprint identification system for sharing integrators between two sensor pixel circuitry.

FIG. 14C is a diagram showing an exemplary sensor pixel circuitry and fingerprint identification system 1420 with two sensor pixel circuitry sharing an integrator. The fingerprint identification system 1420 shows a simple example where two sensor pixel circuitry 1422 and 1424 share one integrator 1426. The sensor pixel circuitry 1422 and 1424 can be substantially similar to sensor pixel circuitry 10 in FIG. 2 or any other configurations described in this patent document.

Figure 14D:
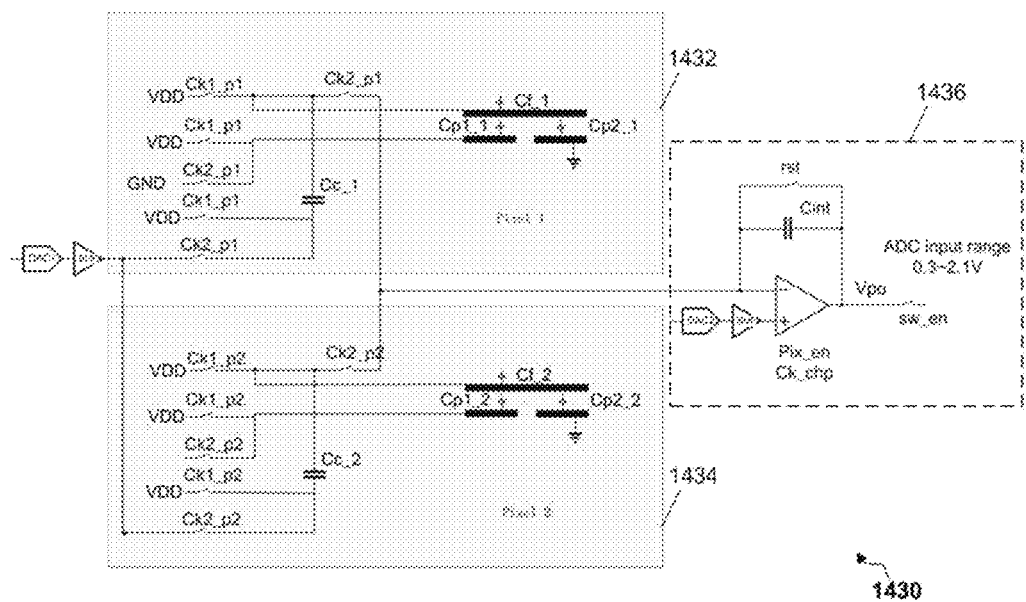
FIG. 14D is a schematic diagram illustrating an exemplary fingerprint identification system for sharing integrators between two sensor pixel circuitry.

FIG. 14D is a diagram showing an exemplary sensor pixel circuitry and fingerprint identification system 1430 with two sensor pixel circuitry sharing an integrator. The fingerprint identification system 1430 shows a simple example where two sensor pixel circuitry 1432 and 1434 share one integrator 1436. The sensor pixel circuitry 1422 and 1424 can be substantially similar to sensor pixel circuitry in FIGS. 11, 12 and 13 or any other configurations described in this patent document.

In the examples shown in FIGS. 14A, 14B, 14C and 14D, some of the components including the ADC are not included in the figures for illustrative purposes only.

Various implementations and examples of the disclosed technology have been described. The disclosed technology utilizes integrators for storing the electric charges accumulated by the touch sensing capacitor, utilizes the voltage generator for outputting the variable voltage and adjusting the electric charges stored in the parasitic capacitors, and utilizes the sensor pixel circuitry with a dedicated integrator for performing integration across a group of sensor pixel circuitry in parallel to enhance the SNR. The sensor pixel circuitry and the fingerprint identification system described in this patent document provide accurate fingerprint identification even without a metal ring.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A fingerprint sensor device for fingerprint detection, comprising:
an array of sensor pixels configured to capacitively couple with a touched portion of a finger to form an array of fingerprint associated capacitors having capacitive values indicative of a fingerprint,
each sensor pixel including:
an output terminal configured to output an output signal that indicates a local capacitive coupling with the touched portion of the finger as part of fingerprint data for fingerprint detection;
a capacitive sensing layer including an electrically conductive material that can be capacitively coupled to a local part of the touched portion of the finger, forming a fingerprint associated capacitor, the capacitive sensing layer operable to be coupled to the output terminal to cause the output signal;
an integrated circuit layout layer that is electrically conductive and is capacitively coupled to a ground terminal, forming a layout associated capacitor, the layout layer operable to be coupled to the output terminal;
a fingerprint voltage generator electrically coupled to supply power to the capacitive sensing layer to generate a fingerprint voltage to charge the fingerprint associated capacitor; and
a layout voltage generator electrically coupled to supply power to the integrated circuit layout layer to generate a layout voltage to charge the layout associated capacitor.

2. The fingerprint sensor device of claim 1, comprising:
fingerprint switching circuitry configured to switch between electrically connecting the capacitive sensing layer to the fingerprint voltage generator and the output terminal to selectively charge the fingerprint associated capacitor using the fingerprint voltage; and
layout switching circuitry configured to switch between electrically connecting the integrated circuit layout layer to the layout voltage generator and the output terminal to selectively charge the layout associated capacitor using the layout voltage.

3. The fingerprint sensor device of claim 2, wherein the fingerprint switching circuitry includes:
a charging switch electrically connected between the fingerprint voltage generator and the capacitive sensing layer to selectively charge the fingerprint associated capacitor during a charging period; and
a sensing switch electrically connected between the capacitive sensing layer and the output terminal to selectively sense a signal associated with the charged fingerprint associated capacitor during a sensing period different from the charging period.

4. The fingerprint sensor device of claim 3, wherein during the charging period, the charging switch is turned on, and the sensing switch is turned off; during the sensing period, the charging switch is turned off, and the sensing switch is turned on.

5. The fingerprint sensor device of claim 2, wherein the layout switching circuitry includes:
a charging switch electrically connected between the layout voltage generator and the integrated circuit layout layer to selectively charge the layout associated capacitor during a charging period; and a sensing switch electrically connected between the integrated circuit layout layer and the output terminal to selectively sense a signal associated with the charged layout associated capacitor during a sensing period different from the charging period.

6. The fingerprint sensor device of claim 5, wherein during the charging period, the charging switch is turned on, and the sensing switch is turned off;

during the sensing period, the charging switch is turned off, and the sensing switch is turned on.

7. The fingerprint sensor device of claim 1, wherein the capacitive sensing layer is configured to form with a surface of a finger two opposing conductive electrodes of the finger associated capacitor.

8. The fingerprint sensor device of claim 1, wherein the fingerprint voltage generator and the layout voltage generator are configured to vary the generated fingerprint and layout voltages independent of each other.

9. The fingerprint sensor device of claim 1, wherein each of the fingerprint voltage generator and the layout voltage generator include a digital to analog converter to vary the generated fingerprint and layout voltages.

10. The fingerprint sensor device of claim 1, comprising:
an integrator electrically coupled to the output terminal connected to the fingerprint associated capacitor and the layout associated capacitor to store electrical charges associated with the charged fingerprint associated capacitor responsive to a touch by a finger of a user.

11. The fingerprint sensor device of claim 10, wherein the integrator comprises:
a reference voltage generator configured to generate a reference voltage;
an amplifier, comprising:
a positive input terminal electrically coupled to the reference voltage generator to receive the reference voltage;
a negative input terminal electrically coupled to the output terminal connected to the fingerprint associated capacitor and the layout associated capacitor; and
an output terminal of the amplifier;
an integrating capacitor electrically coupled between the negative input terminal and the output terminal of the amplifier; and
a reset switch electrically coupled between the negative input terminal and the output terminal of the amplifier.

12. The fingerprint sensor device of claim 11, wherein the reference voltage generator includes a digital to analog converter to vary the generated reference voltage.

13. The fingerprint sensor device of claim 1, wherein the output terminal connected to the fingerprint associated capacitor and the layout associated capacitor is configured to generate the output signal associated with a ridge or a valley of a finger.

14. The fingerprint sensor device of claim 1, wherein the array of sensor pixels are arranged to form groups of electrically connected sensor pixel circuitry operable to capture fingerprint pattern of the touched portion of the finger, each sensor pixel circuitry in the array comprises:
a separate analog to digital converter electrically coupled to each group of electrically connected sensor pixel circuitry;
a separate enable switch electrically coupled between each sensor pixel circuitry in a corresponding group of electrically connected sensor pixel circuitry and a corresponding analog to digital converter; and
a control module electrically coupled to each sensor pixel circuitry in the array, the control module configured to generate a control signal to control each sensor pixel circuitry in the array.

15. The fingerprint sensor device of claim 14, wherein:
the control module is configure to generate the control signal to control each sensor pixel circuitry in the array to integrate the output signal in each sensor pixel circuitry in the array in parallel.

16. A fingerprint sensor device for fingerprint detection, the fingerprint sensor device comprising:
an output terminal configured to output an output signal indicative of capacitive coupling with a touched portion of a finger as a part of fingerprint data for fingerprint detection;
a sensor electrode including electrically conductive material that can be capacitively coupled to the touched portion of the finger, forming a fingerprint associated capacitor, the capacitive sensing layer operable to be coupled to the output terminal to cause the output signal;
a pair of substantially identical integrated circuit layout electrodes that are electrically conductive, wherein:
one of the pair of substantially identical integrated circuit layout electrodes is capacitively coupled to the sensor electrode, forming a first layout associated capacitor; and
other of the pair of substantially identical integrated circuit layout electrodes is capacitively coupled to the sensor electrode, forming a second layout associated capacitor;
a fingerprint voltage generator coupled to supply a fingerprint voltage to charge the fingerprint associated capacitor; and
the layout voltage generator coupled to supply a layout voltage to the other of the pair of substantially identical integrated circuit layout electrodes to charge the second layout associated capacitor.

17. The fingerprint sensor device of claim 16, comprising:
fingerprint switching circuitry configured to switch between electrically connecting the sensor electrode to the fingerprint voltage generator and the output terminal; and
layout switching circuitry configured to switch between electrically connecting the other of the pair of substantially identical integrated circuit layout electrodes to the layout voltage generator and the ground terminal.

18. The fingerprint sensor device of claim 16, wherein the layout voltage generator includes a variable voltage generator.

* * * * *